No. 775,332. PATENTED NOV. 22, 1904.
O. C. KAVLE.
CYLINDER SCALE FOR TYPE WRITERS.
APPLICATION FILED MAR. 5, 1903.
NO MODEL.
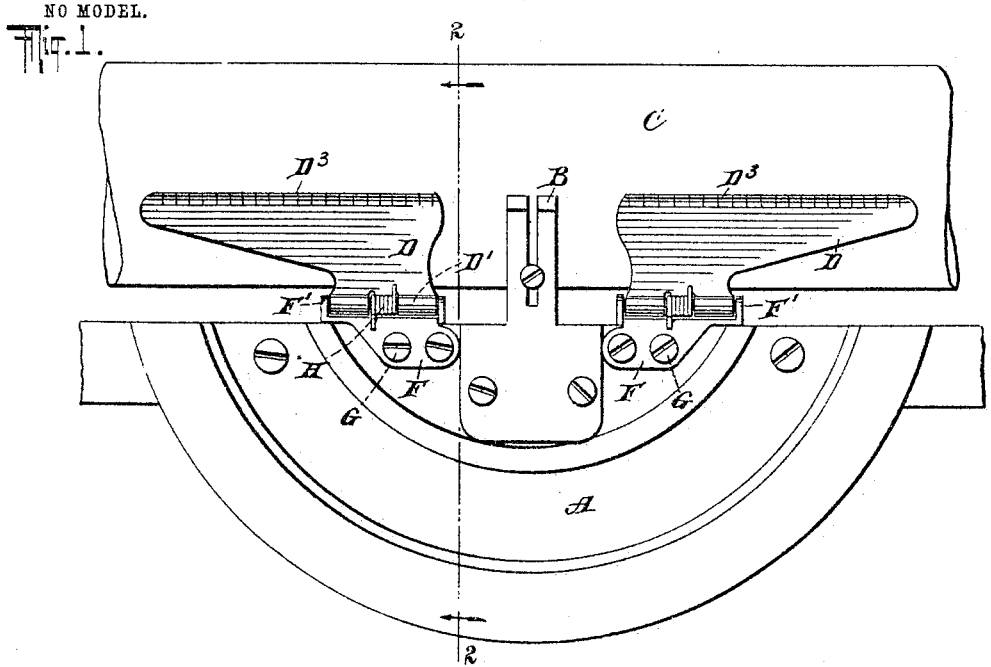
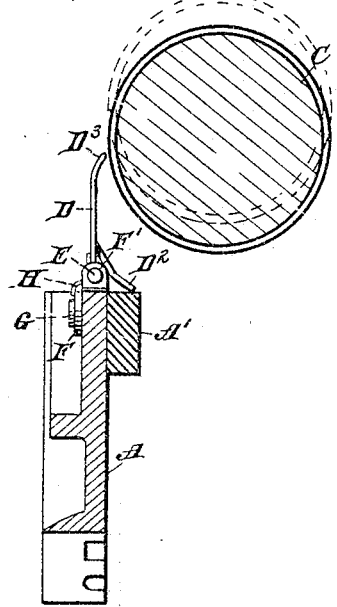
WITNESSES:
John A. Stehlenbeck
John Lotka
INVENTOR
Oscar C. Kavle
BY
Briesen & Knauth
ATTORNEYS No. 775,332. Patented November 22, 1904.

UNITED STATES PATENT OFFICE.

OSCAR C. KAVLE, OF HARTFORD, CONNECTICUT, ASSIGNOR TO UNDERWOOD TYPEWRITER COMPANY, OF NEW YORK, N. Y., A CORPORATION OF NEW JERSEY.

CYLINDER-SCALE FOR TYPE-WRITERS.

SPECIFICATION forming part of Letters Patent No. 775,332, dated November 22, 1904.

Application filed March 5, 1903. Serial No. 146,323. (No model.)

*To all whom it may concern:*

Be it known that I, OSCAR C. KAVLE, a citizen of the United States, and a resident of Hartford, county of Hartford, State of Connecticut, have invented certain new and useful Improvements in Cylinder-Scales for Type-Writers, of which the following is a specification.

My invention relates to type-writers, and particularly to the scales which are adapted to lie adjacent to the paper where it passes over the cylinder or platen.

The object of my invention is principally to keep the scale in its proper position irrespective of the position of the platen and to prevent the scale from rubbing on the paper and blurring the type-written matter when the platen is shifted from the upper-case position to the lower position, and vice versa.

The invention will be fully described hereinafter and the features of novelty pointed out in the appended claim.

Reference is to be had to the accompanying drawings, in which—

Figure 1 is a front view showing the segment on which the type-bars are mounted, the type-bar guide arranged adjacent to the printing-point, the cylinder or platen, and the cylinder-scale; and Fig. 2 is a sectional elevation on line 2 2 of Fig. 1.

A designates the segment forming a stationary support for the type-bars, B the guide which the type-bars engage as they approach the impression-point, and C the platen arranged to be shifted to different positions. (See dotted lines in Fig. 2.) These parts may be of any usual or approved construction.

At each side of the type-bar guide B, with their upper edges approximately in line with that of the said guide, are located the cylinder-scales D. Each of these is formed at its lower end with eyes D', through which passes a pintle E, carried by lugs F', projected upwardly from a plate or bracket F. These plates or brackets are rigidly secured to the segment A, as by screws G, so that the brackets and their lugs or ears F' virtually form part of the segment A. A spring H is coiled on each pintle E between the eyes D', and the ends of said spring engage the scale D and the plate F, respectively, and have a tendency to throw the scale D rearward—that is, toward the platen. Thus the springs H press the scales D toward the platen in a direction transverse to the shifting movement of said platen. The rearward movement of the scale is limited by the engagement of a toe $D^2$ on the plate D, with a stop A' formed upon or secured to the segment A. At its upper edge, which preferably is curved rearward, so as to lie close to the platen or cylinder, each of the scales is provided with a graduation $D^3$, the divisions of which correspond to letter-spaces.

It will be understood that the toe $D^2$ governs the position of the scale D, and particularly the upper edge of said scale, so that while said edge will lie close to the platen and to the paper thereon the scale will not rub against the paper. This is of importance not only when the paper is fed by turning the platen, but particularly in those cases where the platen is shifted bodily from an upper-case position to the lower-case position. It will be understood that the position of the scale D will always be the same, irrespective of any movement of the platen. Of course the scale may yield outwardly or forwardly to permit the paper to be properly introduced; but the inward movement of the scale is limited by the toe $D^2$ working in conjunction with the stop A'.

Modifications, as long as they remain within the scope of the appended claim, will constitute no departure from the nature of my invention.

What I claim as new, and desire to secure by Letters Patent, is—

The combination with a stationary support and a shifting platen, of a scale pivoted to said support, and a spring for pressing the scale toward the platen in a direction transverse to the shifting movement of the platen, said scale being provided with a projection arranged to engage a stationary stop to limit the movement of the scale toward the platen, so that the shifting of the platen will not affect the normal position of the scale, the latter remaining stationary when the platen is shifted.

In testimony whereof I have hereunto set my hand in the presence of two subscribing witnesses.

OSCAR C. KAVLE.

Witnesses:
   EDW. J. MANNING,
   J. J. MURPHY.